US010602546B2

(12) United States Patent
Choi et al.

(10) Patent No.: US 10,602,546 B2
(45) Date of Patent: *Mar. 24, 2020

(54) METHOD AND APPARATUS FOR TRANSMITTING FRAME IN WIRELESS LAN

(71) Applicant: LG ELECTRONICS INC., Seoul (KR)

(72) Inventors: Jinsoo Choi, Seoul (KR); Kiseon Ryu, Seoul (KR); Wookbong Lee, Seoul (KR); Jinyoung Chun, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,196

(22) Filed: Aug. 28, 2018

(65) Prior Publication Data
US 2018/0368185 A1 Dec. 20, 2018

Related U.S. Application Data

(63) Continuation of application No. 15/119,346, filed as application No. PCT/KR2014/012438 on Dec. 17, 2014, now Pat. No. 10,080,240.

(Continued)

(51) Int. Cl.
H04W 74/08 (2009.01)
H04W 52/14 (2009.01)
(Continued)

(52) U.S. Cl.
CPC ..... *H04W 74/0816* (2013.01); *H04W 52/143* (2013.01); *H04W 72/0453* (2013.01); *H04W 84/12* (2013.01)

(58) Field of Classification Search
CPC .......... H04W 74/0816; H04W 52/143; H04W 72/0453; H04W 84/12
See application file for complete search history.

(56) References Cited

U.S. PATENT DOCUMENTS 5,754,947 A 5/1998 Tanabe et al.
5,771,462 A 6/1998 Olsen
(Continued)

OTHER PUBLICATIONS

U.S. Appl. No. 15/119,346, Office Communication dated Jun. 5, 2018, 3 pages.
(Continued)

*Primary Examiner* — Kevin D Mew
(74) *Attorney, Agent, or Firm* — Lee Hong Degerman Kang Waimey

(57) ABSTRACT

A device and method for transmitting a frame in a wireless LAN, with the method including the steps of: transmitting, by an AP, an RTS frame for medium protection to a first STA set; receiving, by the AP, CTS frames, in sequence, from each of a plurality of STAs included in a second STA set in response to the RTS frame, the second STA set being included in the first STA set; and transmitting, by the AP, each of a plurality of PPDUs to each of the plurality of STAs via each of a plurality of subbands for each of the plurality of STAs on an overlapping time resource.

12 Claims, 15 Drawing Sheets

Related U.S. Application Data

(60) Provisional application No. 61/941,401, filed on Feb. 18, 2014.

(51) Int. Cl.
*H04W 72/04* (2009.01)
*H04W 84/12* (2009.01)

(56) References Cited

U.S. PATENT DOCUMENTS

| | | |
|---|---|---|
| 7,463,645 B2 | 12/2008 | Diepstraten et al. |
| 7,477,621 B1 | 1/2009 | Loc et al. |
| 8,081,996 B2 | 12/2011 | Kolavennu et al. |
| 8,750,192 B2 | 6/2014 | Amini et al. |
| 8,848,680 B2 | 9/2014 | Lee et al. |
| 9,237,521 B2 | 1/2016 | Seok |
| 9,332,571 B2 | 5/2016 | Zhu et al. |
| 9,564,999 B2 | 2/2017 | Kim et al. |
| 9,577,838 B2 | 2/2017 | Seok |
| 9,622,267 B2 | 4/2017 | Kwon et al. |
| 9,730,246 B2 | 8/2017 | Merlin et al. |
| 10,080,240 B2 | 9/2018 | Choi et al. |
| 2005/0058151 A1 | 3/2005 | Yeh |
| 2007/0248038 A1 | 10/2007 | Yamasaki et al. |
| 2008/0112351 A1 | 5/2008 | Surineni et al. |
| 2008/0144493 A1 | 6/2008 | Yeh |
| 2010/0309871 A1 | 12/2010 | Fischer et al. |
| 2010/0316150 A1 | 12/2010 | Amini et al. |
| 2011/0038332 A1 | 2/2011 | Liu et al. |
| 2011/0103280 A1 | 5/2011 | Liu et al. |
| 2011/0149882 A1 | 6/2011 | Gong et al. |
| 2011/0199953 A1 | 8/2011 | Seok |
| 2012/0082040 A1 | 4/2012 | Gong et al. |
| 2012/0082147 A1 | 4/2012 | Liu et al. |
| 2012/0087316 A1 | 4/2012 | Merlin et al. |
| 2012/0087358 A1 | 4/2012 | Zhu et al. |
| 2012/0147804 A1 | 6/2012 | Hedayat et al. |
| 2012/0182867 A1 | 7/2012 | Farrag et al. |
| 2012/0207074 A1 | 8/2012 | Kneckt |
| 2012/0213184 A1 | 8/2012 | Choi et al. |
| 2013/0195081 A1 | 8/2013 | Merlin et al. |
| 2014/0003367 A1 | 1/2014 | Viger et al. |
| 2014/0003414 A1 | 1/2014 | Choudhury et al. |
| 2014/0064231 A1 | 3/2014 | Park et al. |
| 2014/0112224 A1* | 4/2014 | Jafarian ............ H04W 52/0209 370/311 |
| 2014/0140264 A1 | 5/2014 | Lv et al. |
| 2014/0247824 A1 | 9/2014 | Sohn et al. |
| 2014/0334387 A1 | 11/2014 | Doppler et al. |
| 2015/0063148 A1 | 3/2015 | Sadek |
| 2016/0037484 A1* | 2/2016 | Kwon ................ H04W 72/005 370/312 |
| 2016/0057736 A1* | 2/2016 | Jung .................... H04W 74/06 370/329 |
| 2016/0113009 A1* | 4/2016 | Seok ................... H04B 7/0452 370/329 |
| 2016/0249381 A1 | 8/2016 | Choi et al. |
| 2017/0006596 A1* | 1/2017 | Adachi ............ H04W 72/0453 |
| 2017/0013645 A1 | 1/2017 | Choi et al. |
| 2017/0055290 A1 | 2/2017 | Lv et al. |
| 2017/0118604 A1 | 4/2017 | Kim et al. |

OTHER PUBLICATIONS

U.S. Appl. No. 15/119,346, Notice of Allowance dated Feb. 14, 2018, 13 pages.
U.S. Appl. No. 15/119,346, Office Action dated Sep. 7, 2017, 22 pages.
European Patent Office Application Serial No. 14883373.4, Search Report dated Sep. 25, 2017, 12 pages.
Cai, et al., "A Distributed Multi-USer MIMO MAC Protocol for Wireless Local Area Networks", IEEE Globecom 2008, 5 pages.

* cited by examiner

METHOD AND APPARATUS FOR TRANSMITTING FRAME IN WIRELESS LAN

CROSS-REFERENCE TO RELATED APPLICATIONS

This application is a continuation of U.S. patent application Ser. No. 15/119,346, filed on Aug. 16, 2016, now U.S. Pat. No. 10,080,240, which is the National Stage filing under 35 U.S.C. 371 of International Application No. PCT/KR2014/012438, filed on Dec. 17, 2014, which claims the benefit of U.S. Provisional Application No. 61/941,401, filed on Feb. 18,2014, the contents of which are all incorporated by reference herein in their entirety.

BACKGROUND OF THE INVENTION

Field of the Invention

The present invention relates to wireless communication and, most particularly, to a method and apparatus for transmitting a frame in a wireless LAN.

Related Art

The range of channel bandwidths that are available for usage in the legacy wireless LAN system has become diverse from 20 MHz to 160 MHz. Accordingly, deciding an adequate channel bandwidth for the communication between a transmitting user equipment and a receiving user equipment has become a crucial factor in determining Wi-Fi performance.

In order to decide an adequate channel bandwidth for the communication between the transmitting user equipment and the receiving user equipment, a dynamic channel bandwidth configuration protocol, which is based on a RTS (request to send) frame and a CTS(clear to send) frame, has been developed starting from IEEE 802.11ac. The initial RTS frame and CTS frame have been devised to resolve the hidden node issue and to reduce data frame collision overhead. Before transmitting a data frame, the transmitting user equipment transmits a RTS frame to the receiving user equipment. After receiving the RTS frame, the target user equipment sends a response to the transmitting user equipment by using the CTS frame. Third party user equipments that have received the RTS frame and the CTS control frame may delay medium access for a predetermined period of time for the protection of data frame that are to be transmitted later on.

Referring to the dynamic channel bandwidth configuration protocol, which has been supported starting from IEEE 802.11ac, the transmitting user equipment may transmit a RTS frame through a wide band exceeding a channel bandwidth of 20 MHz, and the target user equipment may send a response with a CTS frame in accordance with a channel bandwidth that can be currently used by the corresponding target user equipment. For example, in case the transmitting user equipment wishes to use a channel bandwidth of 160 MHz, the RTS frame is transmitted through a 160 MHz channel bandwidth. In case the channel bandwidth that is currently available for usage of the target user equipment corresponds to 80 MHz, the target user equipment transmits the CTS frame through a 80 MHz channel bandwidth. In case the transmitting user equipment that has transmitted the RTS frame receives a CTS frame through a channel bandwidth of 80 MHz, the data frame that is transmitted afterwards to the target user equipment by the transmitting user equipment should be equal to or smaller than the 80 MHz channel bandwidth.

SUMMARY OF THE INVENTION

Technical Objects

An object of the present invention is to provide a method for transmitting a frame in a wireless LAN.

Another object of the present invention is to provide an apparatus performing a method for transmitting a frame in a wireless LAN.

Technical Solutions

In order to achieve the above-described technical object of the present invention, according to an aspect of the present invention, a method for transmitting a frame in a wireless LAN may include the steps of transmitting, by an AP(access point), a RTS(request to send) frame for medium protection to a first STA(station) group, sequentially receiving, by the AP, CTS(clear to send) frames from each of multiple STAs being included in a second STA set as a response to the RTS frame, wherein the second STA set is included in the first STA set, and respectively transmitting, by the AP, each of multiple PPDUs (physical layer protocol data unit) to each of the multiple STAs through each of multiple subbands for each of the multiple STAs within an overlapping time resource.

In order to achieve the above-described technical object of the present invention, according to another aspect of the present invention, an AP(access point) transmitting a frame in a wireless LAN may include a RF(radio frequency) unit being configured to transmit or receive radio signals, and a processor being operatively connected to the RF unit, wherein the processor may be configured to transmit a RTS(request to send) frame for medium protection to a first STA(station) group, to sequentially receive CTS(clear to send) frames from each of multiple STAs being included in a second STA set as a response to the RTS frame, and to respectively transmit each of multiple PPDUs (physical layer protocol data unit) to each of the multiple STAs through each of multiple subbands for each of the multiple STAs within an overlapping time resource, and wherein the second STA set may be included in the first STA set.

Effects of the Invention

By transmitting a plurality of frames from multiple STAs over an overlapping time resource, the communication efficiency may be enhanced.

DESCRIPTION OF EXEMPLARY EMBODIMENTS

Figure 1:
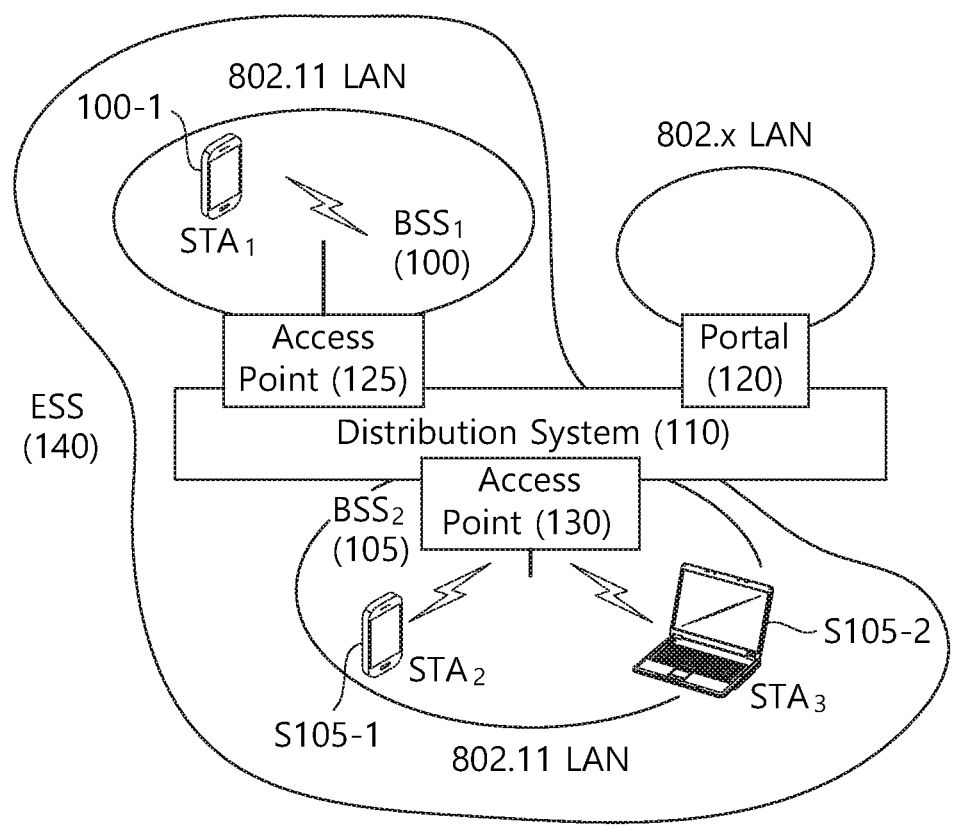
FIG. 1 illustrates a concept diagram illustrating the structure of a wireless local area network (WLAN).
Figure 1:
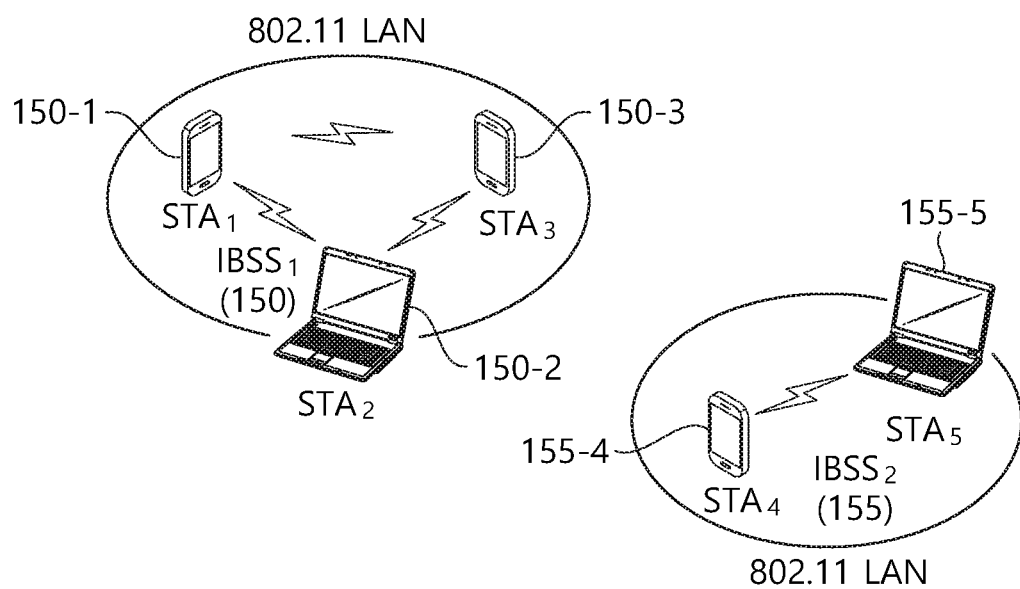

FIG. 1 illustrates a concept diagram illustrating the structure of a wireless local area network (WLAN).

An upper portion of FIG. 1 shows the structure of the IEEE (institute of electrical and electronic engineers) 802.11 infrastructure network.

Referring to the upper portion of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper portion of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower portion of FIG. 1 is a concept view illustrating an independent BSS.

Referring to the lower portion of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
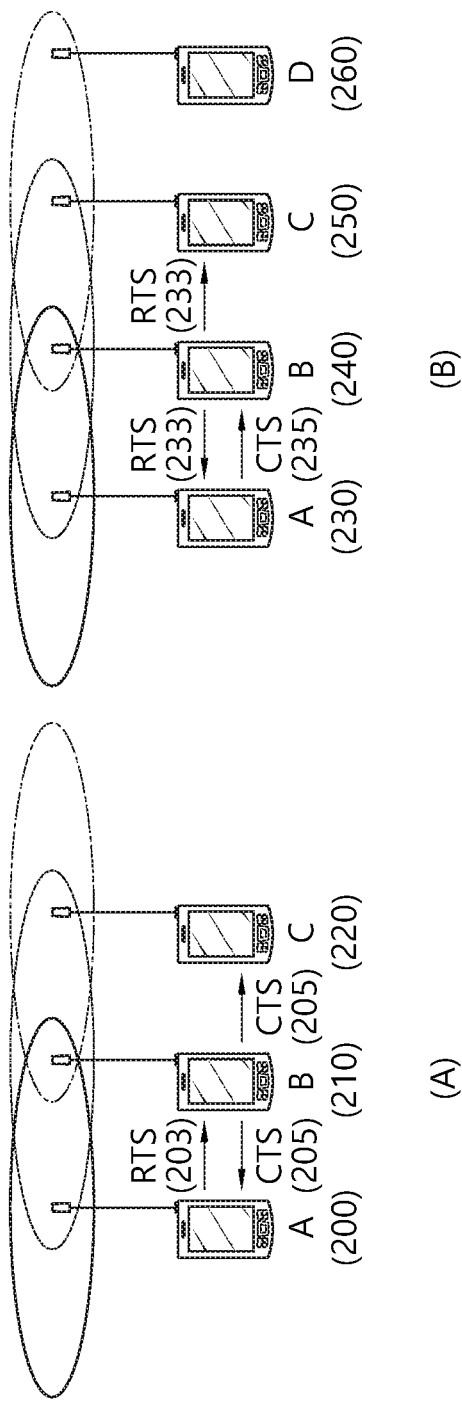
FIG. 2 illustrates a concept diagram showing a method for using a RTS frame and a CTS frame for resolving a hidden node issue and an exposed node issue.

FIG. 2 illustrates a concept diagram showing a method for using a RTS frame and a CTS frame for resolving a hidden node issue and an exposed node issue.

Referring to FIG. 2, in order to solve the hidden node issue and the exposed node issue, a short signaling frame such as a request to send (RTS) frame, a clear to send (CTS) frame, or the like may be used. Neighboring STAs may know whether to transmit or receive data between two STAs on the basis of the RTS frame and the CTS frame.

FIG. 2(A) illustrates a method of transmitting an RTS frame 203 and a CTS frame 205 to solve a hidden node issue.

It may be assumed a case where both of an STA A 200 and an STA C 220 intend to transmit a data frame to an STA B 210. The STA A 200 may transmit the RTS frame 203 to the STA B 210 before transmission of the data frame, and the STA B 210 may transmit the CTS frame 205 to the STA A 200. The STA C 220 may overhear the CTS frame 205, and may know frame transmission from the STA A 200 to the STA B 210 through a medium. The STA C 220 may configure a network allocation vector (NAV) until the end of data frame transmission from the STA A 200 to the STA B 210. An inter-frame collision caused by a hidden node can be avoided by using this method.

FIG. 2(B) illustrates a method of transmitting an RTS frame 233 and a CTS frame 235 to solve an exposed mode issue.

An STA C 250 may determine whether a collision occurs when a frame is transmitted to another STA D 260 on the basis of monitoring of the RTS frame 233 and CTS frame 235 of an STA A 230 and an STA B 240.

The STA B 240 may transmit the RTS frame 233 to the STA A 230, and the STA A 230 may transmit the CTS frame 235 to the STA B 240. The STA C 250 overhears only the RTS frame 233 transmitted by the STA B 240, and fails to overhear the CTS frame 235 transmitted by the STA A 230. Therefore, the STA C 250 may know that the STA A 230 is located out of a carrier sensing range of the STA C 250. Accordingly, the STA C 250 may transmit data to the STA D 260.

An RTS frame format and a CTS frame format are disclosed in the 8.3.1.2 RTS frame format and 8.3.1.3 CTS frame format of IEEE P802.11-REVmcTM/D2.0, October 2013.

Figure 3:
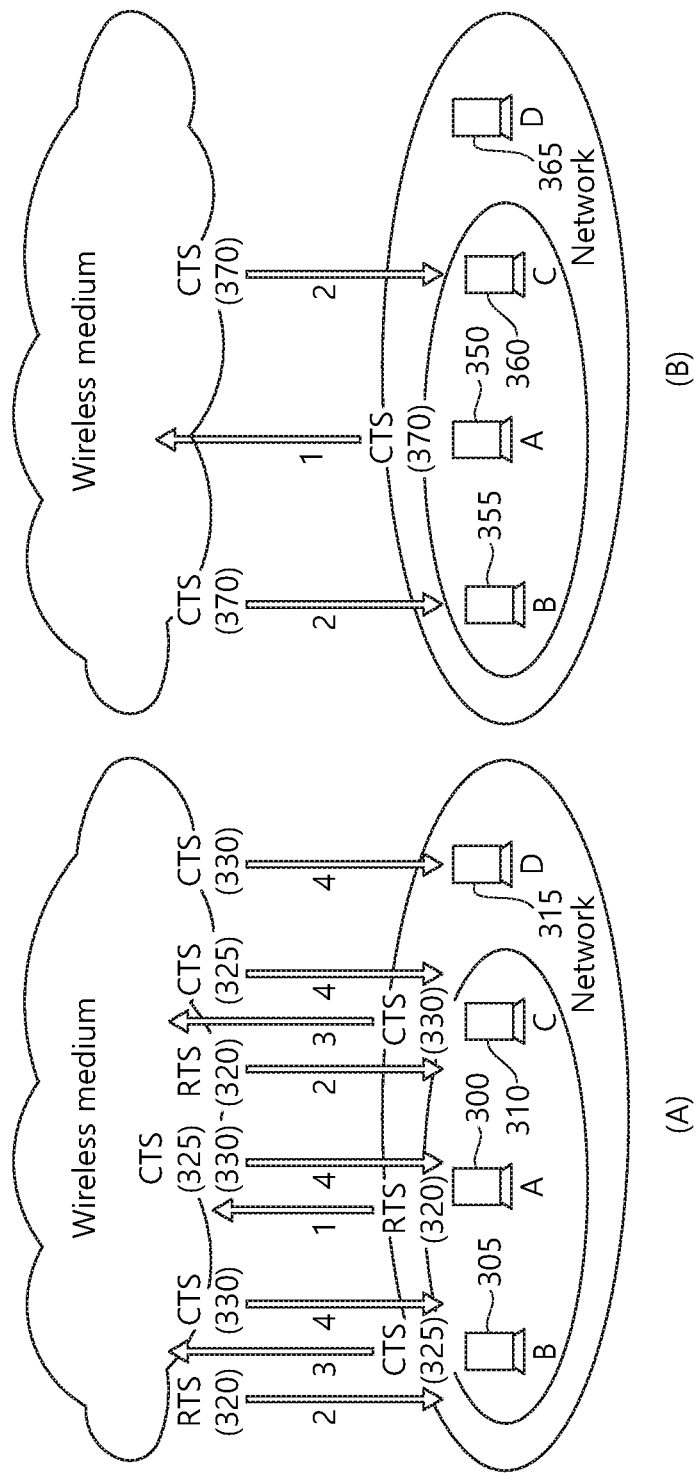
FIG. 3 illustrates a concept diagram showing a CTS-to-Self Mechanism.

FIG. 3 illustrates a concept diagram showing a CTS-to-Self Mechanism.

Referring to FIG. 3, a comparison between a case of sensing a medium by using an exchange method between a RTS frame and a CTS frame ((A) of FIG. 3) and a case of sensing a medium by using a CTS-to-Self frame ((B) of FIG. 3).

A CTS-to-self protection mechanism is defined in the IEEE 802.11g specification. The CTS-to-self protection mechanism may be used instead of the medium sensing mechanism, which uses a RTS frame and a CTS frame. In case of using the CTS-to-self protection mechanism, the overhead of the medium may be reduced as compared to when using the medium sensing mechanism, which uses RTS/CTS frames.

Referring to (A) of FIG. 3, the method for exchanging the RTS frame and the CTS frame before the transmitting end transmits the data frame may be performed as described below.

In (A) of FIG. 3, a case when STA A 300 attempts to send a data frame to STA B 305 or STA C 310 will be assumed.

1) STA A 300 transmits a RTS frame 320.

2) The RTS frame 320 is received by STA B 305 and STA C 310, which is exist in a carrier sensing range.

3) STA B 305 and STA C 310 transmit CTS frames 325 and 330.

4) The transmitted CTS frames 325 and 330 are transmitted to STA A 300, STA B 305, STA C 310, and STA D 315.

In case of STA D 315, since STA D 315 exists outside of the carrier sensing range of STA A 300, STA D 315 was unable to receive the RTS frame 320 transmitted by STA A 300 (i.e., STA D 315 is a hidden node of STA A 300). Nevertheless, by receiving the CTS frame 330 transmitted by STA C 310, it will be apparent that STA A 300 has occupied the medium in order to transmit data. STA D may configure a NAV and may not access the medium.

5) STA A 300 transmits a data frame to STA C 310.

Referring to (b) of FIG. 3, a CTS-to-self frame based medium sensing method, which is performed before the transmitting end transmits the data frame, may be performed as described above. In (B) of FIG. 3, a case when STA A 300 attempts to send a data frame to STA C 360 will be assumed.

1) STA A 350 transmits a CTS-to-self frame 370, which exists in the carrier sensing range, to STA B 355 and STA C 360.

2) After receiving the CTS-to-self frame 370, STA B 355 and STA C 360 delay the transmitted of another data frame in order to receive the data frame that is being transmitted from the STA A 350.

In case of using the above-described method, STA D 365, which exists outside of the coverage region of STA A 350, in unable to receive the CTS-to-self frame 370 from STA A 350. Therefore, STA D 365 cannot know whether or not the data frame has been transmitted by STA A 350.

In this case, when STA D 365 transmits a data frame to STA A 350 or STA C 360, a collision may occur between data frames. More specifically, the method of using a CTS-to-self frame 370 cannot resolve the hidden node issue. Therefore, method of using a CTS-to-self frame 370 may be applied only to the case when the STAs are capable of sensing the data frame transmission occurring between one another, and, in other cases, the medium may be sensed by using the method of exchanging RTS/CTS frames.

An AP(access point) that operates in a wireless local area network (WLAN) system may transmit different sets of data to each of the multiple STAs(stations) through the same (or overlapping) time resource. If the transmission from the AP to the STA is referred to as a downlink transmission, such transmission of the AP may be expressed by using the term DL MU transmission (or downlink multi-user transmission).

In the legacy wireless system, the AP was capable of performing DL MU transmission based on MU MIMO (multiple input multiple output), and such transmission may be expressed by using the term DL MU MIMO transmission. In the exemplary embodiment of the present invention, the AP may perform DL MU transmission based on OFDMA (orthogonal frequency division multiplexing access), and such transmission may be expressed by using the term DL MU OFDMA transmission. In case of using the DL MU OFDMA transmission, the AP may transmit a downlink frame to each of the multiple STAs through each of the multiple frequency resources within the overlapping time resource.

Each of the PPDU, frame, and data being transmitted via downlink transmission may be respectively expressed by using the terms downlink PPDU, downlink frame, and downlink data. The PPDU may correspond to a data unit including a PPDU header and a PDSU(physical layer service data unit) (or MPDU(MAC protocol data unit)). The PPDU header may include a PHY header and a PHY preamble, and the PDSU (or MPDU) may include a frame or may indicate a frame.

Conversely, the transmission from the STA to the AP may be referred to as an uplink transmission. The data transmission of multiple STAs to the AP within the same (or overlapping) time resource may be expressed by using the term UL MU transmission (or uplink multi-user transmission). Unlike in the legacy wireless LAN system, the UL MU transmission may be supported in the wireless LAN system according to the exemplary embodiment of the present invention. Each of the PPDU, frame, and data being transmitted via uplink transmission may be respectively expressed by using the terms uplink PPDU, uplink frame, and uplink data. The uplink transmission performed by each of the multiple STAs may be respectively performed within different frequency domains (subbands) or within different spatial domains.

In case the uplink transmission performed by each of the multiple STAs is respectively performed within different frequency domains (or different subbands), different frequency resources respective to each of the multiple STAs may be allocated as the uplink transmission resource based on OFDMA. Each of the multiple STAs may respectively transmit an uplink frame to the AP through each of the different frequency resources allocated thereto. Such transmission method using different frequency resources may also be expressed by using the term UL MU OFDMA transmission method.

In case the uplink transmission performed by each of the multiple STAs is respectively performed within different spatial domains, different space time streams (or spatial streams) may be allocated with respect to each of the multiple STAs. Each of the multiple STAs may respectively transmit an uplink frame to the AP through different space time streams. Such transmission method using different space time streams may also be expressed by using the term UL MU MIMO transmission method.

In the next generation wireless LAN, demands for high throughput and enhanced QoE(quality of experience) are increasing. In case of adopting a new frame (or PPDU) format for the next generation wireless LAN system, the design of a new system should be realized without any performance impact from legacy STAs, which support only the legacy wireless LAN system. Additionally, the next generation wireless LAN system is also required to be designed not to be influenced by any performance impact caused by the presence of a legacy STA.

As described above, the DL MU OFDMA transmission was not supported in the legacy (or conventional) wireless LAN system. In the legacy wireless LAN system, a wider bandwidth based on multi-channels was allocated for the communication between one STA and one AP. The multi-channel may correspond to a bandwidth exceeding 20 MHz and including a primary channel and a secondary channel.

In the legacy wireless LAN system, restrictions (or limitations) existed in the operation of a wider bandwidth due to a primary channel rule. According to the primary channel rule, the STA may perform communication through the multi-channel including the secondary channel only in a case when the secondary channel is idle. More specifically, in case the secondary channel, which is adjacent to the primary channel, is being used in an OBSS(overlapped BSS) (i.e., in case the secondary channel is busy), the bandwidth cannot be expanded to a multi-channel, and the STA may perform communication only through the primary channel STA. In case the primary channel rule is being applied, it may be difficult to operate a wider bandwidth in an environment having more than a few OBSSs.

Accordingly, instead of a single STA, in case multiple STAs perform communication through a multi-channel simultaneously (or within an overlapping time resource) based on DL MU OFDMA, the usage efficiency of the frequency resource may be increased.

In case using the DL MU OFDMA transmission, it may be importance to decide OFDMA subband granularity. In case the DL MU is performed based on the OFDMA transmission, the OFDMA subband granularity may correspond to a subband (or frequency resource) unit being allocated for the communication of one STA.

In case a subband having a size smaller than the basic 20 MHz unit, which was used in the legacy wireless LAN system, is being used for the DL MU OFDMA communication, a problem may occur in the co-existence of the legacy STA, which is operated based on the legacy 20 MHz frequency band, and the STA, which supports DL MU OFDMA communication, and which is operated based on a frequency band less than 20 MHz. For example, a problem may occur with respect to medium protection (or channel protection) based on a RTS frame and a CTS frame.

Considering backward compatibility, in the next generation wireless LAN system, which operates based on DL MU OFDMA, for a successful reception of a RTS frame or a CTS frame of the legacy STA and for a NAV configuration, the RTS frame (or PPDU) or the CTS frame (CTS PPDU) may maintain the conventional (or legacy) frame format or (PPDU format).

The exemplary embodiment of the present invention discloses a medium protection method that is based on the RTS frame and CTS frame in an environment where a legacy STA and an STA supporting the next generation wireless LAN system co-exist. The legacy STA may correspond to an STA that can be operated within a multi-channel of a 20 MHz bandwidth unit, which is decided based on the primary channel rule. The STA supporting the next generation wireless LAN system may also be operated within a subband less than 20 MHz (or a subband of 20 MHz or more) based on DL MU OFDMA or UL MU OFDMA. Hereinafter, in the exemplary embodiment of the present invention, unless it is separately expressed as a legacy STA, the STA may refer to an STA supporting the next generation wireless LAN system.

Additionally, hereinafter, in the exemplary embodiment of the present invention, a case when the OFDMA subband granularity is equal to 5 MHz will be assumed. More specifically, one STA may perform communication with the AP based on a minimum subband of 5 MHz. Nevertheless, communication based on DL MU OFDMA and/or UL MU OFDMA, which is based on an OFDMA subband granularity of 20 MHz or less or 20 MHz or more, instead of 5 MHz, may also be performed.

Additionally, hereinafter, although a case when a downlink frame (or downlink PPDU) is respectively transmitted to each of the multiple STAs by the AP based on DL MU OFDMA is assumed in the exemplary embodiment of the present invention, the medium protection method based on the RTS frame/CTS frame according to the exemplary embodiment of the present invention may also be used in a case when a downlink frame (or downlink PPDU) is respectively transmitted to each of the multiple STAs by the AP through different space time streams based on DL MU MIMO.

Figure 4:
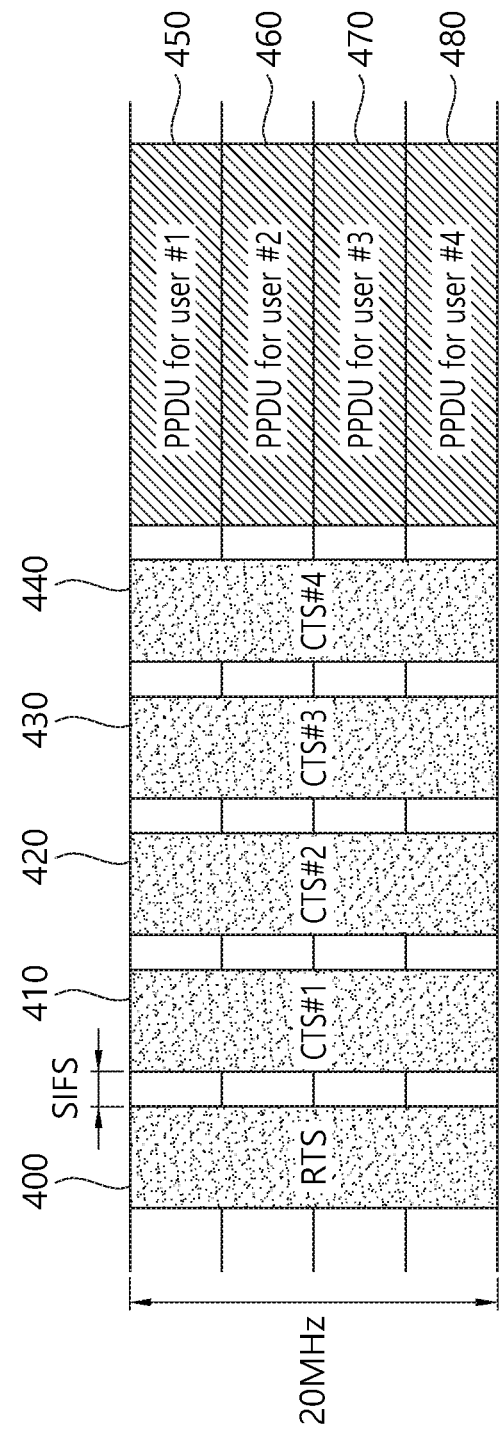
FIG. 4 illustrates a concept diagram showing a medium protection method when performing OFDMA communication based communication in a wireless LAN according to an exemplary embodiment of the present invention.

FIG. 4 illustrates a concept diagram showing a medium protection method when performing OFDMA communication based communication in a wireless LAN according to an exemplary embodiment of the present invention.

FIG. 4 discloses a method of sequentially transmitting CTS frames 410, 420, 430, and 440 in response to a RTS frame 400.

Referring to FIG. 4, the AP may transmit a RTS frame 400 to multiple STAs configuring an OFDMA packet. In other words, the AP may transmit a RTS frame 400 to each of the multiple STAs, which are to respectively transmit multiple downlink frames, based on the DL MU OFDMA transmission. Hereinafter, each of the multiple STAs configuring an OFDMA packet, each of the multiple STAs that are to be respectively receive each of the downlink frames, which are transmitted by the AP based on DL MU OFDMA transmission, may be expressed by using the term DL MU target STA.

The RTS frame 400 may include identification information respective to each of the multiple DL MU target STAs (e.g., MAC address respective to each of the multiple DL MU target STAs or an ID respective to each of the multiple DL MU target STAs (AID(association identifier), PAID (partial association identifier)).

A RA field of the RTS frame 400 may have a format for including identification information respective to multiple DL MU target STAs instead of the identification information of one DL MU target STA. In case the RTS frame 400 maintains its conventional format, the legacy STA may decode only the duration field, which is located before the RA field of the RTS frame 400, so as to configure the NAV. Therefore, even in case the format respective to the RA field of the RTS frame 400 is changed, there may be no impact (or influence) on the legacy STA.

Each the multiple DL MU target STAs may sequentially transmit CTS frames 410, 420, 430, and 440 in response to the RTS frame 400. The transmission order of the CTS frames 410, 420, 430, and 440 of the multiple DL MU target STAs may be decided based on diverse methods. For example, the transmission order of the CTS frames 410, 420, 430, and 440 of the multiple DL MU target STAs may be decided based on an index (or position) of the allocated subband. For example, in case the OFDMA subband granularity is equal to 5 MHz, a frequency bandwidth of 20 MHz may include 4 subbands, and a subband index respective to each of the 4 subbands may correspond to Subband 1, Subband 2, Subband 3, and Subband 4.

In order to establish communication between STA1 to STA4 and the AP, a case when Subband 1 is allocated to STA1, when Subband 2 is allocated to STA2, when Subband 3 is allocated to STA3, and when Subband 4 is allocated to STA4 may be assumed. The subbands that are allocated to each of the STAs for the DL MU transmission may be decided based on the RTS frame 400 or may be decided based on an exchange procedure of another frame prior to the transmission of the RTS frame/CTS frame. In this case, in accordance with the order of the subband index, each of STA1, STA2, STA3, and STA4 may sequentially transmit CTS frames 410, 420, 430, and 440. STA1 receives the RTS frame 400, and, after a SIFS(short interframe space), STA1 may transmit CTS Frame 1 410 to the AP. Thereafter, STA2, STA3, and STA4 may sequentially transmit CTS Frame 2 420, CTS Frame 3 430, and CTS Frame 4 440. More specifically, STA2 monitors the transmission of CTS Frame 1 410 performed by STA1, and, then, after a SIFS after the transmission of CTS Frame 1 410, STA2 may transmit CTS Frame 2 420. Alternatively, considering the subband index that is allocated after the reception of the RTS frame 400, STA2 decides the transmission timing of CTS Frame 2 420, and, then, STA2 may transmit CTS Frame 2 420 at the decided transmission timing of CTS Frame 2 420.

According to another exemplary embodiment of the present invention, the transmission order of the CTS frames 410, 420, 430, and 440 of the multiple DL MU target STAs may be decided based on an order of identification information respective to each of the multiple DL MU target STAs included in the RA field of the RTS frame 400. For example, a plurality of bits configuring the RA field of the RTS frame 400 may sequentially indicate STA1, STA2, STA3, and STA4 as the multiple DL MU target STAs. In this case, considering the order indicated by the RA field, each of STA1, STA2, STA3, and STA4 may transmit CTS Frame 1 410, CTS Frame 2 420, CTS Frame 3 430, and CTS Frame 4 440 to the AP by the order of STA1, STA2, STA3, and STA4.

The CTS frames 410, 420, 430, and 440 may not include a TA(transmitter address) field including identification information of the transmitting end (or each of the multiple DL MU target STAs transmitting the CTS frames 410, 420, 430, and 440). In this case, as described above, the AP may acquire information respective to the DL MU STAs, which have transmitted the CTS frames 410, 420, 430, and 440 based on the pre-decided transmission order of the CTS frames 410, 420, 430, and 440 or the reception timing of the CTS frames 410, 420, 430, and 440.

The RTS frame 400 and the CTS frames 410, 420, 430, and 440 may be transmitted through the entire bandwidth for the transmission of the RTS frame 400 and the CTS frames 410, 420, 430, and 440. More specifically, instead of being transmitted based on OFDMA, the RTS frame 400 and the CTS frames 410, 420, 430, and 440 may be transmitted through an entire bandwidth that is allocated based on one PPDU. The format of such PPDU may be expressed by using the term non-duplicate PPDU format. Alternatively, the RTS frame and the CTS frames may also be transmitted through multiple channels based on a duplicate PPDU format. The duplicate PPDU format may replicate a PPDU format being transmitted through a neighboring channel (or primary channel) (20 MHz) and may then be transmitted through a bandwidth exceeding 20 MHz (e.g., 40 MHz, 80 MHz, 160 MHz, 80 MHz+80 MHz, and so on). In case the duplicate format is used, one PPDU including the data that are replicated through each of the multiple channels (replication target channel and replicate channel).

The RTS PPDU and CTS PPDU of the non-duplicate PPDU format or the duplicate PPDU format may be transmitted to at least one STA (or AP) through at least one space time stream.

According to another exemplary embodiment of the present invention, the RTS frame 400 may also be transmitted based on a DL MU transmission method. More specifically, in case of the RTS frame 400, different RTS frames 400 may be respectively transmitted to multiple STAs through different space time streams based on the DL MU MIMO transmission. Alternatively, different RTS frames 400 may be respectively transmitted to multiple STAs through different frequency resources (or subbands, channels) based on DL MU OFDMA. In this case, the RTS frames 400 being transmitted through different space time streams or different frequency resources may not include the same information. More specifically, the AP may respectively transmit each of the multiple RTS frames 400 to each of the STAs based on the DL MU transmission. For example, a RTS frame 400 that is being transmitted through a specific space time stream or a specific frequency resource based on the DL MU transmission may only indicate a specific STA that is to receive the RTS frame 400 through a specific frequency resource.

The AP may respectively receive CTS frames 410, 420, 430, and 440 from multiple DL MU target STAs and may transmit downlink frames (or downlink data frames or downlink management frames) based on the DL MU OFDMA transmission.

In FIG. 4, a case when the RTS frame 400 is transmitted to multiple DL MU target STAs, when each of the multiple DL MU target STAs that has received the RTS frame 400 sequentially transmits the CTS frames 410, 420, 430, and 440 to the AP, and when the CTS frames 410, 420, 430, and 440 that are transmitted by each of the multiple DL MU target STAs are successfully decoded in the AP, is assumed.

The AP may transmit each of the multiple downlink frames (downlink PPDUs) to each of the multiple DL MU target STAs within the overlapping time resource through the subbands allocated to each of the multiple DL MU target STAs.

For example, the AP may transmit Downlink Frame 1 (Downlink PPDU 1) 450 to STA1 through Subband 1, the AP may transmit Downlink Frame 2 (Downlink PPDU 2) 460 to STA2 through Subband 2, the AP may transmit Downlink Frame 3 (Downlink PPDU 3) 470 to STA3 through Subband 3, and the AP may transmit Downlink Frame 4 (Downlink PPDU 4) 480 to STA4 through Subband 4.

Figure 5:
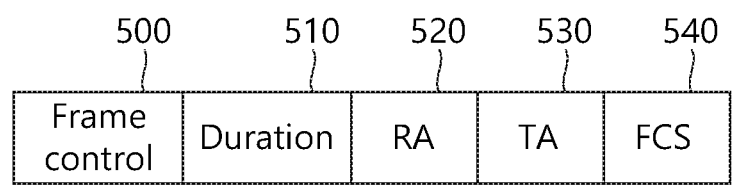
FIG. 5 illustrates a concept diagram of a RTS frame according to an exemplary embodiment of the present invention.

FIG. 5 illustrates a concept diagram of a RTS frame according to an exemplary embodiment of the present invention.

Referring to FIG. 5, the RTS frame may include a frame control field 500, a duration field 510, a RA(receiver address) field 520, a TA(transmitter address) field 530, and a FCS(frame check sequence) field 540.

The frame control field 500 may include information for indicating the RTS frame.

The duration field 510 may include duration information for the transmission of a CTS frame, an uplink transmission indication frame, uplink frames respective to each of the multiple STAs, and an ACK frame. As described in the exemplary embodiment of the present invention, in case multiple CTS frames are sequentially received, the duration field 510 may include duration information that has considered the reception of multiple CTS frames.

The RA field 520 may include information indicating the DL MU target STA that is to transmit the CTS frame. For example, the RA field 520 may correspond to a field of 48 bits (6 octets). In case a maximum of 4 STAs support the UL MU transmission, among the 48 bits, 12 bits may be allocated in order to identify one STA. As described above, the DL MU target STA may transmit the CTS frame while considering the order of the identifiers of the multiple STA, which are included in the received RA field.

The TA field 530 may include an address of the AP transmitting the RTS frame.

The FCS field 540 may include information for verifying the validity of a frame.

Figure 6:
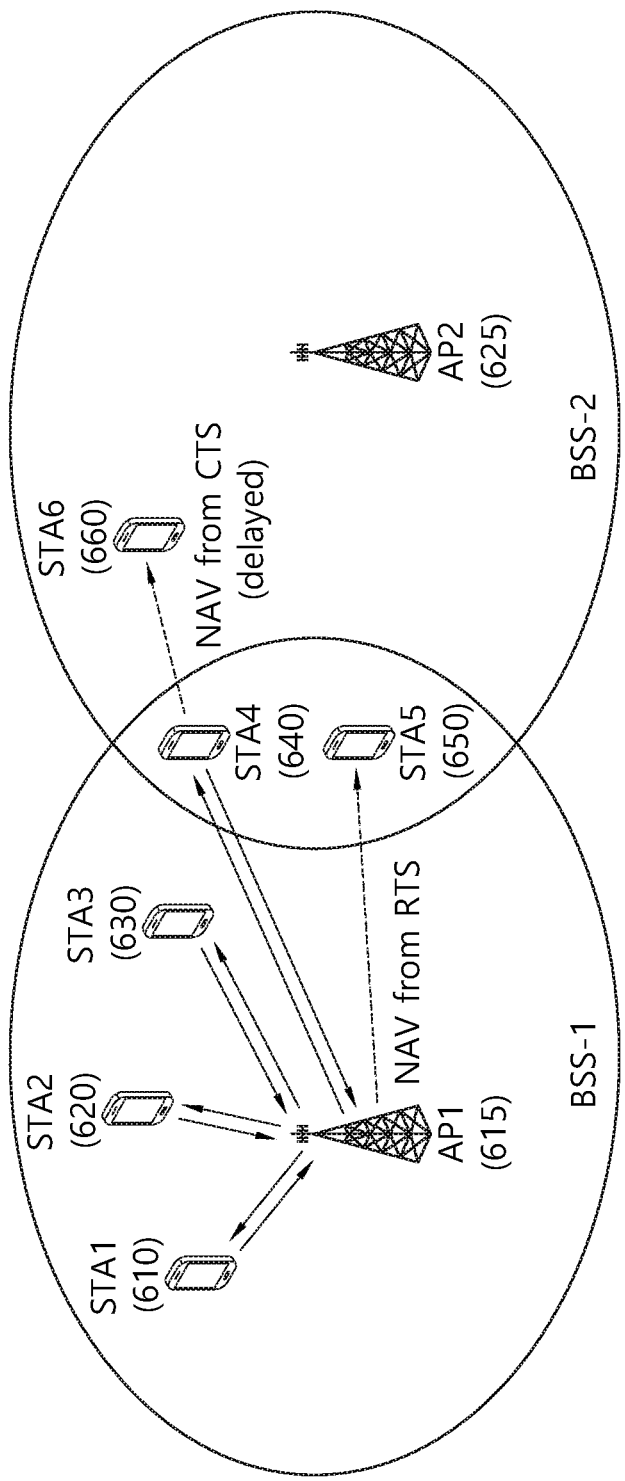
FIG. 6 illustrates a concept diagram showing a collision between a BSS supporting DL MU OFDMA transmission and a BSS not supporting DL MU OFDMA transmission.
Figure 7:
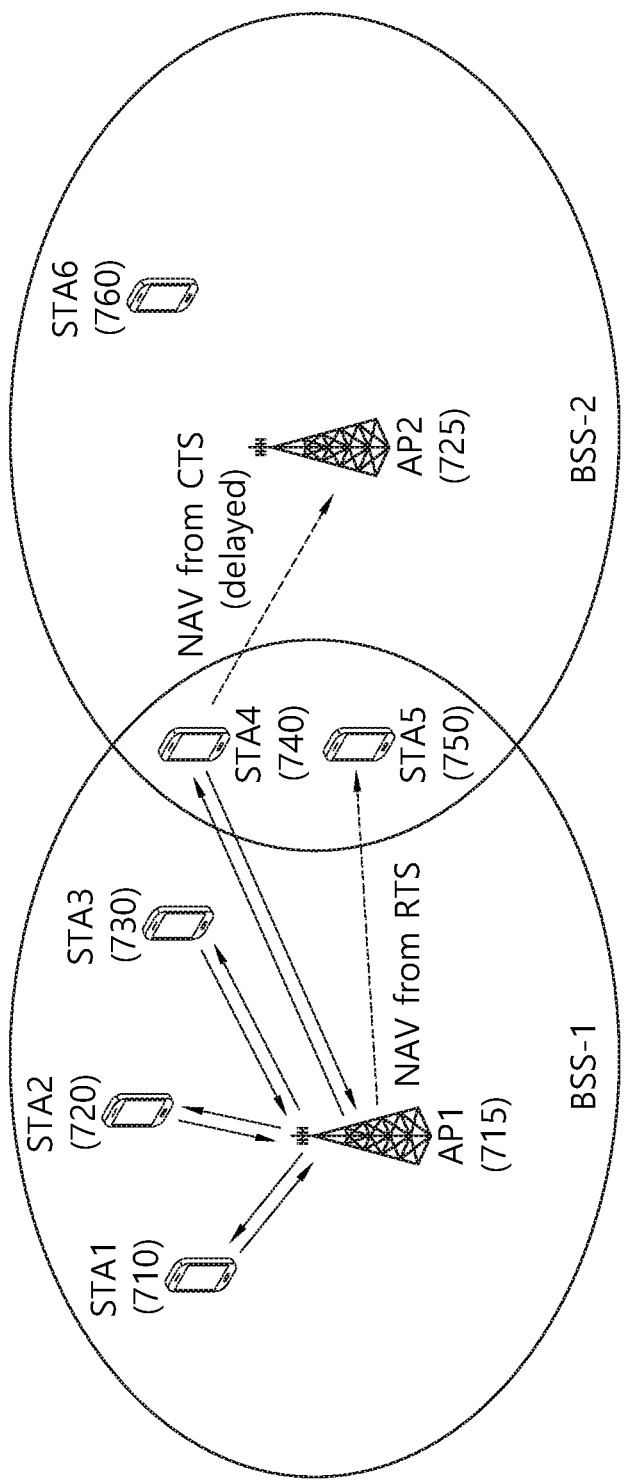
FIG. 7 illustrates a concept diagram showing a collision between a BSS supporting DL MU OFDMA transmission and a BSS not supporting DL MU OFDMA transmission.

FIG. 6 and FIG. 7 disclose collisions that may occur between a BSS supporting the DL MU OFDMA transmission and a neighboring BSS that does not support the DL MU OFDMA transmission.

FIG. 6 illustrates a concept diagram showing a collision between a BSS supporting DL MU OFDMA transmission and a BSS not supporting DL MU OFDMA transmission.

Referring to FIG. 6, in BSS1 supporting the DL MU OFDMA transmission, AP1 615 may transmit a RTS frame to multiple DL MU target STAs (STA1 610, STA2 620, STA3 630, and STA4 640), and, in response to the RTS frame, AP1 615 may receive a CTS frame from each of the multiple DL MU target STAs (STA1 610, STA2 620, STA3 630, and STA4 640).

In BSS2 that does not support the DL MU OFDMA transmission, STA5 650 may receive a RTS frame, which is transmitted by AP1 615, and may then configure a NAV. In BSS2, STA6 660 may only receive the CTS frame, which was transmitted by STA4 640. If STA6 acquires the authority to access a medium through a back-off procedure prior to the reception of the CTS frame of STA6 660 (or the transmission of the CTS frame of STA4), STA6 660 may transmit an uplink frame to AP2 625 without configuring a NAV. In this case, a collision may occur between the uplink frame transmitted by STA6 660 and the downlink frame transmitted by AP1 615 in the receiving end of STA4 640.

FIG. 7 illustrates a concept diagram showing a collision between a BSS supporting DL MU OFDMA transmission and a BSS not supporting DL MU OFDMA transmission.

Referring to FIG. 7, in BSS1 supporting the DL MU OFDMA transmission, AP1 715 may transmit a RTS frame to multiple DL MU target STAs (STA1 710, STA2 720, STA3 730, and STA4 740), and, in response to the RTS frame, AP1 715 may receive a CTS frame from each of the multiple DL MU target STAs (STA1 710, STA2 720, STA3 730, and STA4 740).

In BSS2 that does not support the DL MU OFDMA transmission, STA5 750 may receive a RTS frame, which is transmitted by AP1 715, and may then configure a NAV. AP2 725 may be incapable of receiving the RTS frame transmitted from AP1 715, and AP2 725 may receive the CTS frame transmitted by STA4 740. In case AP2 725 acquires the authority to access a medium through a back-off procedure before receiving the CTS frame (or before the transmission of the CTS frame by STA4 740), AP2 725 may transmit a downlink frame to STA6 720 without configuring a NAV. In this case, a collision may occur between the downlink frame transmitted by AP2 725 and the downlink frame transmitted by AP1 715 in the receiving end of STA4 740.

Hereinafter, the exemplary embodiment of the present invention discloses a method for preventing the problem of collision between frames shown in FIG. 6 and FIG. 7.

Hereinafter, in the exemplary embodiment of the present invention, BSS1 may indicate a BSS that supports the DL MU OFDMA, and BSS2 may indicate a BSS that does not support the DL MU OFDMA and that is adjacent to BSS1 or that overlaps with BSS1.

Figure 8:
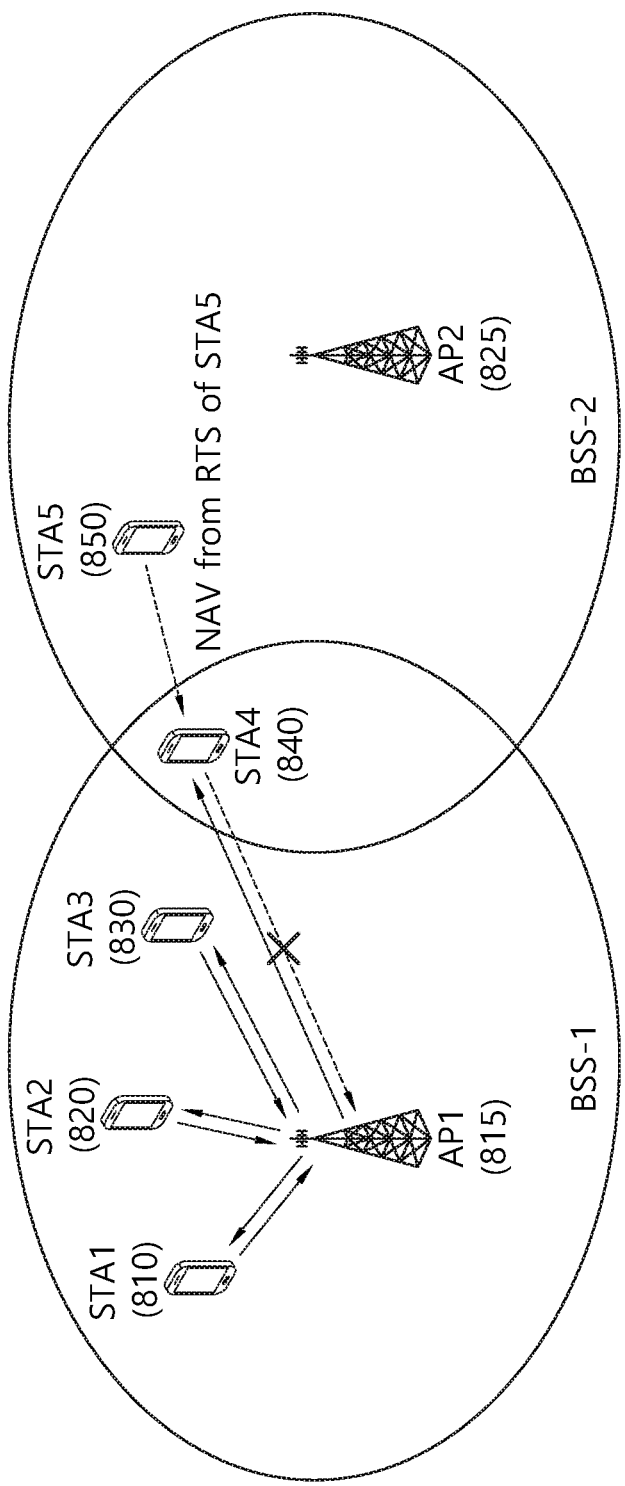
FIG. 8 illustrates a medium protection method according to an exemplary embodiment of the present invention.

FIG. 8 illustrates a medium protection method according to an exemplary embodiment of the present invention.

FIG. 8 discloses a method for deciding whether or not the DL MU target STA, which is included in BSS1, should transmit a CTS frame in response to the RTS frame based on the frame that is being transmitted by BSS2.

As described above in the procedure of FIG. 5, in BSS1, AP1 815 may transmit the RTS frame to multiple DL MU target STAs. According to the exemplary embodiment of the present invention, among the multiple DL MU target STAs that have received the RTS frame, a DL MU target STA, which has detected the occupation of the medium by the AP or STA included in BSS2, may not transmit a CTS frame.

For example, after the reception of the RTS frame that is transmitted by AP1 815, which is included in BSS1, STA4 840 may receive the RTS frame that is transmitted by STA5 850. In this case, STA4 840 may not transmit a CTS frame in response to the RTS frame, which is transmitted by AP1 815. Alternatively, STA4 840 may transmit a CTS frame. However, the CTS frame may include additional information indicating that the reception of a downlink frame cannot be performed (or the reception of the downlink frame is not available).

In case AP1 815 fails to receive a CTS frame from STA4 840, it will be apparent that a downlink frame cannot be transmitted to STA4 840 through any one of the subbands included in the entire band (e.g., 20 MHz) that has transmitted the RTS frame. More specifically, in BSS2, since the legacy STA (STA5 850) and AP2 825 performs communication through a minimum band of 20 MHz, a collision between the frames may occur regardless of the subband, which is included within 20 MHz, that is used by AP1 815 to transmit a downlink frame to STA4. Therefore, AP1 cannot transmit a downlink frame to STA4.

FIG. 8 discloses a method for not transmitting a CTS frame, in a case when a DL MU STA (STA4 840), which has received the RTS frame transmitted by AP1 815, detects a RTS frame being transmitted by STA5 850, which is included in BSS2, before transmitting the CTS frame.

However, in addition to the RTS frame transmitted by STA5 850, the STA4 840 may detect a CTS frame of STA5 850 being transmitted as a response to the RTS frame, which is transmitted by AP2 825, and an ACK frame of STA5 850 being transmitted as a response to the downlink frame, which is transmitted by AP2 825, and may not transmit the CTS frame to AP1 815.

Among the multiple DL MU target STAs, in case a DL MU target STA that does not transmit a CTS frame exists, the AP may transmit a downlink frame to the remaining DL MU target STAs excluding the DL MU target STA that does not transmit a CTS frame based on DL MU OFDMA. In the case shown in FIG. 8, in case the subband being allocated to STA4 840 corresponds to Subband 4, AP1 815 may respectively transmit Downlink Frame 1 to STA1 810, Downlink Frame 2 to STA2 820, and Downlink Frame 3 to STA3 830 through the remaining subbands (Subbands 1, 2, and 3) excluding Subband 4 based on DL MU OFDMA.

FIG. 8 discloses a method according to which the DL MU target STA detects a frame being transmitted by a STA included in BSS2 and does not transmit a CTS frame. The DL MU target STA may also detect a frame being transmitted by an AP included in BSS2 and may not transmit a CTS frame.

More specifically, the AP may transmit a RTS(request to send) for medium protection to a first STA(station) set, and the AP may sequentially receive a CTS(clear to send) from each of the multiple STAs included in a second STA set in response to the RTS frame.

The first STA set may include DL MU target STAs that are indicated based on the RTS frame, which is transmitted by the AP. The RA field of the RTS frame may include identification information of the multiple STAs included in the first STA set. Among the multiple DL MU target STAs, the second STA set may include STAs that have transmitted a CTS frame to the AP. The remaining STAs that are included in the first STA set and yet not included in the second STA set may correspond to DL MU target STAs, which have detected the occupation of the medium by another AP or another STA, and which may configure a NAV and not transmit the CTS frame.

The AP may respectively transmit each of the multiple PPDUs to each of the multiple STAs being included in the second STA set through each of the multiple subbands for each of the multiple STAs within the overlapping time resource. The AP may transmit data units including dummy signals through subbands that are allocated to the remaining STAs, which are included in the first STA set yet not included in the second STA set within the overlapping time resource. Alternatively, the AP may also decide a transmission power respective to each of the multiple PPDUs while considering the size of the subbands being allocated to the remaining STAs, which are included in the first STA set yet not included in the second STA set within the overlapping time resource. This will be described later on in more detail.

Figure 9:
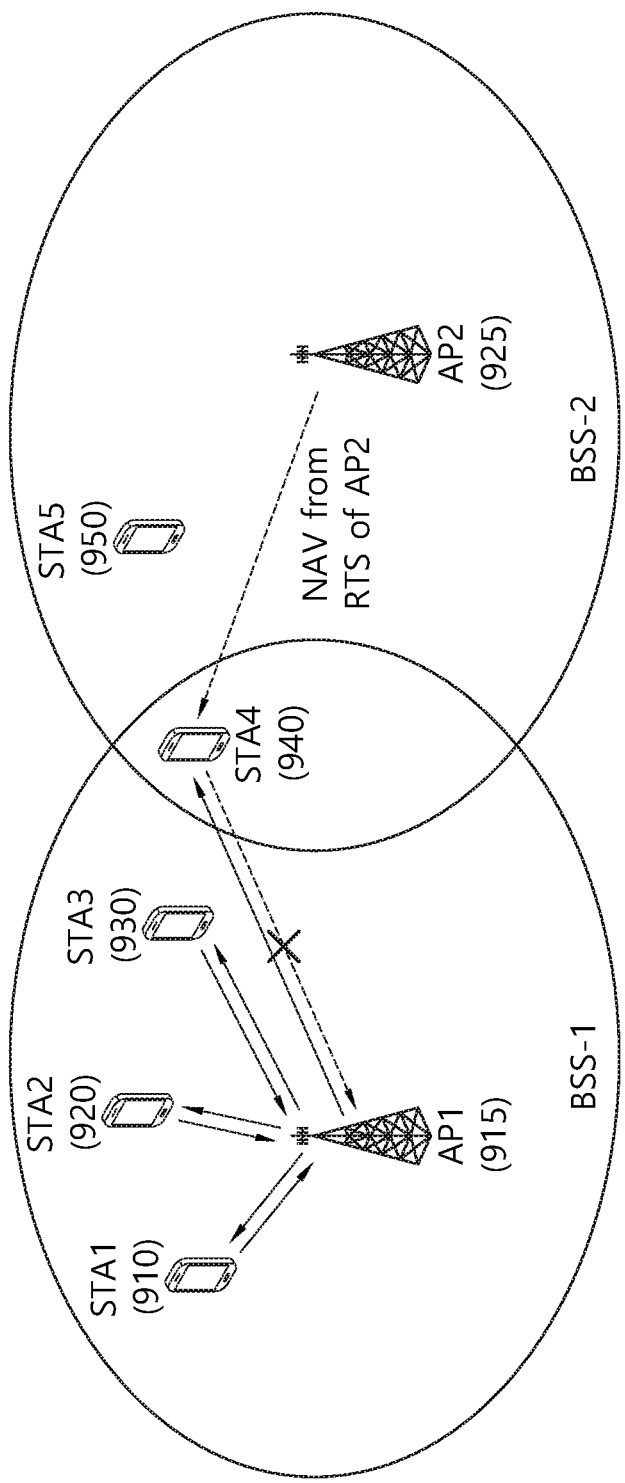
FIG. 9 illustrates a medium protection method according to an exemplary embodiment of the present invention.

FIG. 9 illustrates a medium protection method according to an exemplary embodiment of the present invention.

FIG. 9 discloses a method for deciding whether or not the DL MU target STA, which is included in BSS1, should transmit a CTS frame in response to the RTS frame based on the frame that is being transmitted by BSS2.

As described above in the procedure of FIG. 5, in BSS1, the AP may transmit the RTS frame to multiple DL MU target STAs. Among the multiple DL MU target STAs that have received the RTS frame, a DL MU target STA, which has detected the occupation of the medium by the AP or STA included in BSS2, may not transmit a CTS frame.

For example, after the reception of the RTS frame that is transmitted by AP1 915, which is included in BSS1, STA4 940 may receive the RTS frame that is transmitted by AP2 925. In this case, STA4 940 may not transmit a CTS frame in response to the RTS frame, which is transmitted by AP1 915. Alternatively, STA4 940 may transmit a CTS frame. However, the CTS frame may include additional information indicating that the reception of a downlink frame cannot be performed (or the reception of the downlink frame is not available). In case AP1 915 fails to receive a CTS frame from STA4 940, it will be apparent that a downlink frame cannot be transmitted to STA4 940.

FIG. 9 discloses a method for not transmitting a CTS frame, in a case when a DL MU STA, which corresponds to STA4 940, that has received the RTS frame transmitted by AP1 915, detects a RTS frame being transmitted by AP2 925, which is included in BSS2, before transmitting the CTS frame.

However, in addition to the RTS frame transmitted by AP2 925, STA4 940 may detect a CTS frame of AP2 925 being transmitted as a response to the RTS frame, which is transmitted by STA5 950, and an ACK frame of AP2 925 being transmitted as a response to the downlink frame, which is transmitted by STA5 950, and may not transmit the CTS frame.

Among the multiple DL MU target STAs, in case a DL MU target STA that does not transmit a CTS frame exists, the AP may transmit a downlink frame to the remaining DL MU target STAs excluding the DL MU target STA that does not transmit a CTS frame based on DL MU OFDMA.

Figure 10:
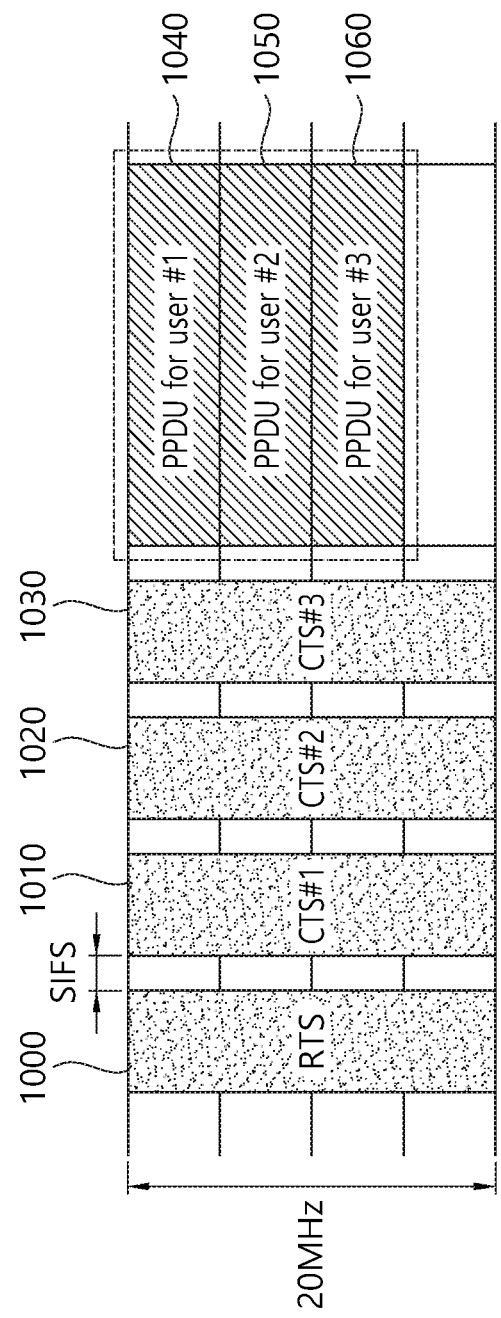
FIG. 10 illustrates a concept diagram of a downlink frame being transmitted based on DL MU OFDMA according to an exemplary embodiment of the present invention.

FIG. 10 illustrates a concept diagram of a downlink frame being transmitted based on DL MU OFDMA according to an exemplary embodiment of the present invention.

FIG. 10 discloses a method according to which the AP transmit a downlink frame based on DL MU OFDMA, in a case when a DL MU target STA that has not transmitted a CTS frame exists among the multiple DL MU target STAs.

Referring to FIG. 10, the AP may transmit a RTS frame 1000 to DL MU target STAs (STA1, STA2, STA3, and STA4). The AP may receive CTS Frame 1 1010, CTS Frame 2 1020, and CTS Frame 3 1030, which are respective transmitted by STA1, STA2, and STA3, and the AP may not receive CTS Frame 4 from STA4 1040.

In this case, the AP may transmit a downlink frame to each of STA 1, STA2, and STA3 with the exception for STA4. For example, the AP may transmit Downlink Frame 1 (Downlink PPDU 1) 1040 to STA1 through Subband 1, may transmit Downlink Frame 2 (Downlink PPDU 2) 1050 to STA2 through Subband 2, and may transmit Downlink Frame 3 (Downlink PPDU 3) 1060 to STA3 through Subband 3, based on the DL MU OFDMA transmission with the overlapping time resource. The AP may not transmit Downlink Frame 4 (Downlink PPDU 4) through Subband 4.

Figure 11:
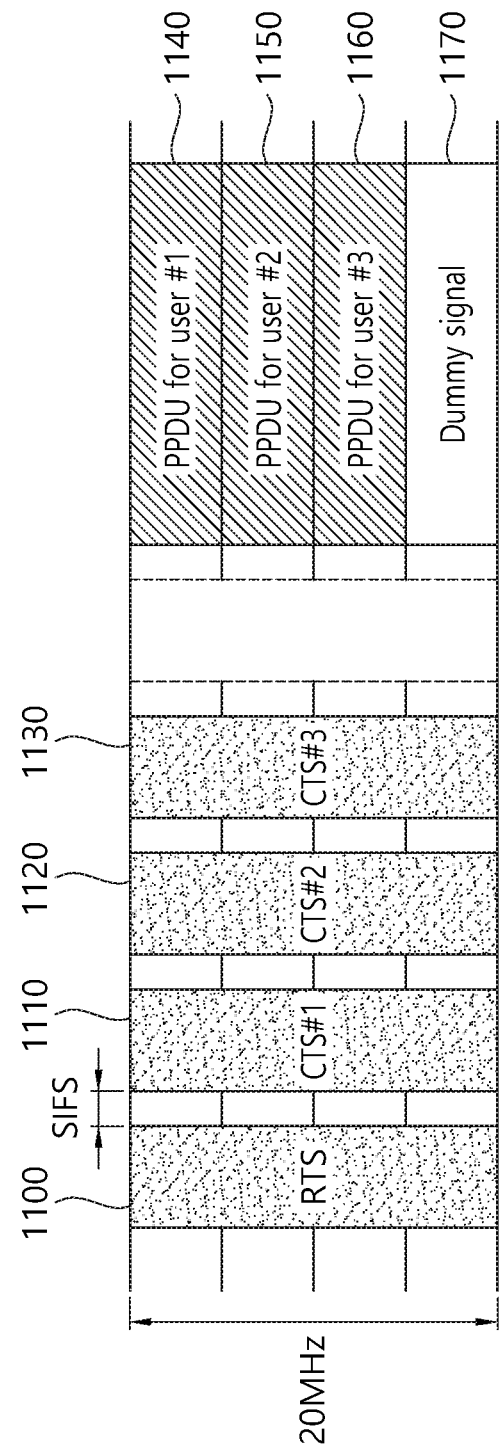
FIG. 11 illustrates a concept diagram of a downlink frame being transmitted based on DL MU OFDMA according to an exemplary embodiment of the present invention.

FIG. 11 illustrates a concept diagram of a downlink frame being transmitted based on DL MU OFDMA according to an exemplary embodiment of the present invention.

FIG. 11 discloses a method according to which the AP transmit a downlink frame based on DL MU OFDMA, in a case when a DL MU target STA that has not transmitted a CTS frame exists among the multiple DL MU target STAs.

Referring to FIG. 11, the AP may transmit a RTS frame 1100 to DL MU target STAs (STA1, STA2, STA3, and STA4). The AP may receive CTS Frame 1 1110, CTS Frame 2 1120, and CTS Frame 3 1130, which are respective transmitted by STA1, STA2, and STA3, and the AP may not receive CTS Frame 4 from STA4.

In case a downlink PPDU is not transmitted through Subband 4, as shown in FIG. 10, the detection levels of the STAs detecting downlink frames, which are being transmitted based on DL MU OFDMA, may be interpreted differently. For example, the STA may differently determine whether the medium is busy or idle in accordance with the number of multiple subframes being transmitted based on DL MU OFDMA. In case the STA has sensed a power level having a predetermined size within the medium based on a CCA(clear channel assessment), the STA may determine that the medium is busy. In this case, the size of the power, which is sensed within the medium in accordance with the number of multiple subframes, may vary, and the interpretation of the state of the medium respective to the STAs may vary accordingly.

In order to resolve such imbalance in the transmission power, the transmission power of the downlink frame (or downlink PPDU) may be adjusted in accordance with the number of multiple subframes being transmitted based on DL MU OFDMA. For example, the transmission power for transmitting Downlink Frame 4 (Downlink PPDU 4) through Subband 4 may be used for the transmission of another one of Downlink Frame 1 to Downlink Frame 3 (Downlink PPDU 1 1140 to Downlink PPDU 3 1160). More specifically, the transmission power for each of Downlink PPDU 1 1140 to Downlink PPDU 3 1160 may be increased while considering the transmission power of Downlink PPDU 4.

Alternatively, the AP may also transmit a data unit 1170 including a dummy signal through Subband 4. More specifically, the AP may determine whether or not to include a dummy signal based on whether or not the CTS frame has been received from the DL MU target STA.

STA4, which detects a frame that is being transmitted by the STA or AP included in BSS2, and which does not transmit a CTS frame to the AP, may already be in a state of configuring a NAV based on a frame, which is transmitted by the STA or AP included in BSS2. Therefore, the transmission of the dummy signal may not cause any influence (or impact) of the performance of STA4.

Figure 12:
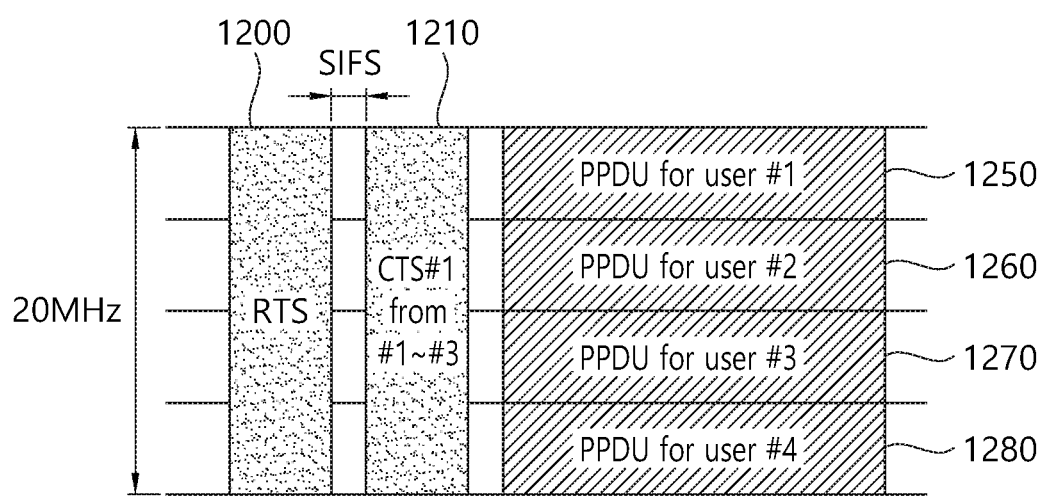
FIG. 12 illustrates a concept diagram of a downlink frame being transmitted based on DL MU OFDMA according to an exemplary embodiment of the present invention.

FIG. 12 illustrates a concept diagram of a downlink frame being transmitted based on DL MU OFDMA according to an exemplary embodiment of the present invention.

In FIG. 12, a CTS frame may be transmitted based on a MBSFN(multicast broadcast single frequency network) method.

Referring to FIG. 12, the AP may transmit a RTS frame 1200 to DL MU target STAs (STA1, STA2, STA3, and STA4). A DL MU target STA may transmit a CTS frame 1210 to the AP by using the MBSFN method. More specifically, the CTS frame 1210 that is being transmitted by the DL MU target STA may include the same data and may be transmitted from an overlapping time resource and an overlapping frequency resource (or within the same (or overlapping) subband). In FIG. 11, a case when STA4 does not transmit CTS Frame 4 will be assumed.

The RA field of the CTS frame 1210 may include identification information (e.g., MAC address) of a transmitting end (e.g., AP) of the RTS frame 1200 being included in the TA field of the RTS frame 1200.

Each of STA1 to STA3 may receive the RTS frame 1200 and may transmit a CTS frame 1210 including the same data in each field after a SIFS. The CTS frame 1210 may not include a field including information on the address of a transmitting end (e.g., TA(transmitter address) field), which has transmitted the CTS frame 1210. Therefore, the AP may be incapable of knowing by which DL MU target STA, among the multiple DL MU target STAs that have received the RTS frame 1200, the CTS frame 1210 has been transmitted.

The AP may transmit a downlink frame to all of the multiple DL MU target STAs, which are targeted by the RTS frame 1200, without considering the DL MU target STA that has not transmitted the CTS frame 1210. Referring to FIG. 12, the AP may also transmit a downlink frame to STA4, which has not transmitted the CTS frame 1210, through Subband 4. The CTS frame 1210 may also be transmitted for the NAV configuration of another STA excluding the DL MU target STAs.

More specifically, the AP may transmit a RTS(request to send) frame for medium protection to a first STA(station) set. The RA(receiver address) field of the RTS frame being transmitted by the AP may include identification information respective to each of the multiple STAs being included in the first STA set. As a response to the RTS frame, the AP may receive a CTS frame from each of the multiple STAs being included in the second STA set within an overlapping time resource and an overlapping frequency resource, and, herein, the second STA set may be included in the first STA set. The first STA set may include DL MU target STAs from which the AP of the RTS frame intends to receive the CTS frame (or to which the AP intends to transmit a downlink frame). The second STA set may include STAs transmitting the CTS frame as a response to the RTS frame.

After receiving a CTS frame from the STA included in the second STA set, the AP may transmit each of the multiple PPDUs to each of the multiple STAs included in the first STA set through each of the multiple subbands for each of the multiple STAs being included in the first STA set within an overlapping time resource.

More specifically, the AP may transmit downlink frames (downlink PPDUs) 1250, 1260, 1270, and 1280 to all of the multiple DL MU target STAs based on the DL MU OFDMA transmission without considering whether or not the reception of the CTS frame 1210, which is transmitted by all of the multiple DL MU target STAs that are targeted by the RTS frame 1200, is successful.

Referring to FIG. 8 and FIG. 9, STA4, which detects the frame being transmitted by the STA (e.g., STA5 in FIG. 8) or the AP (e.g., AP2 in FIG. 9) that is included in BSS2 and does not transmit a CTS frame to the AP, may already be in a state of configuring a NAV based on a frame, which is transmitted by the STA or AP included in BSS2. Therefore, the transmission of the Downlink Frame 4 may not cause any influence (or impact) of the performance of STA4.

Additionally, the frame being transmitted by the STA (e.g., STA5 in FIG. 8) or the AP (e.g., AP2 in FIG. 9) that is included in BSS2 does not cause any interference on the DM MU target STA receiving a downlink frame and being included in the BSS.

The method disclosed in FIG. 12 may effectively support the NAV configuration of a legacy STA. Therefore, this method may be more effective in a BSS or ESS(extended service set), wherein a large number of legacy STAs exist.

Figure 13:
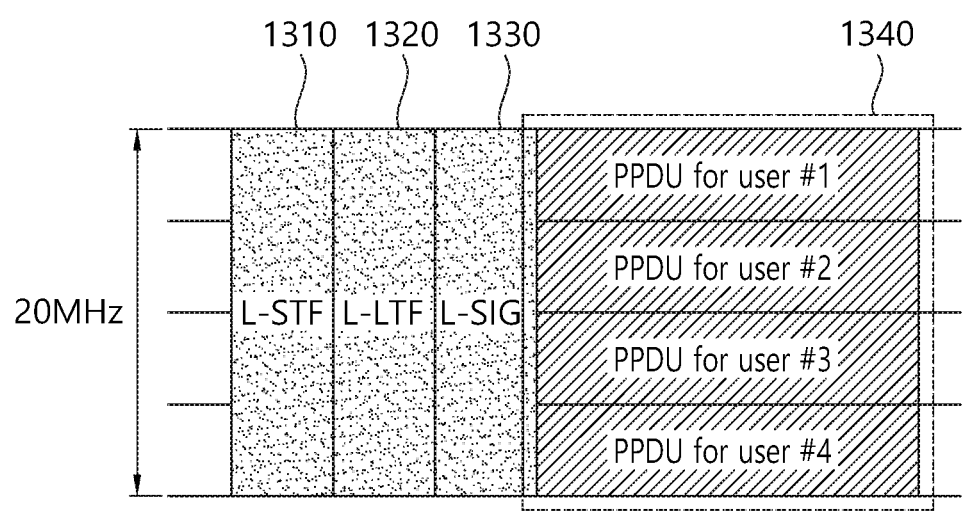
FIG. 13 illustrates a concept diagram showing a downlink frame transmission method of an AP according to an exemplary embodiment of the present invention.

FIG. 13 illustrates a concept diagram showing a downlink frame transmission method of an AP according to an exemplary embodiment of the present invention.

In case multiple downlink PPDUs are transmitted based on DL MU OFDMA without any medium protection based on the RTS frame and the CTS frame, FIG. 13 discloses a medium protection method.

Referring to FIG. 13, when the AP transmits multiple downlink PPDUs based on DL MU OFDMA, a NAV configuration respect to another STA (including legacy STAs) instead of a hidden node (or hidden position) may be supported.

The PPDU carrying (or containing (or including)) a frame may include a legacy part and a non-legacy part. The legacy part may include L-STF 1310, L-LTF 1320, and L-SIG 1330. The non-legacy part 1340 may include a PPDU header (e.g., HE-STF, HE-LTF, and HE-SIG) for a non-legacy wireless LAN system that supports DL MU OFDMA and UL MU OFDMA (or UL MU MIMO), and a MPDU(MAC protocol data unit) (or PSDU(physical layer service data unit)). The non-legacy part 1340 may also be expressed by using the term HEW part (or HE part). The non-legacy part 1340 may include HE-SIG A, HE-STF, HE-LTF, and HE-SIG B, which will be described later on in more detail.

The legacy part 1310, 1320, and 1330 may be transmitted through a 20 MHz band and may be decoded by a legacy STA. The non-legacy part 1340 may be transmitted to multiple STAs based on DL MU OFDMA based on a subband granularity that is smaller than 20 MHz (e.g., 5 MHz).

The legacy STA may receive the legacy part 1310, 1320, and 1330, may configure a NAV based on a legacy field (e.g., length information, MCS information, and so on, included in the legacy field), and may not perform decoding on the non-legacy part 1340.

The STA (or non-legacy STA) may convert the legacy part 1310, 1320, and 1330, which is being transmitted through a 20 MHz band, based on 64FFT, and may perform decoding on the converted part, and the STA may also perform decoding on the remaining non-legacy part 1340, thereby being capable of receiving data.

The legacy STA may not successfully perform decoding starting from the non-legacy part 1340. Accordingly, the legacy STA may know that the received PPDU correspond to a PPDU that is not supported (that the PPDU does not correspond to its packet). Alternatively, a most temporally preceding block within the non-legacy part 1340 (or a most temporally preceding OFDM symbol or most temporally preceding field within the non-legacy part 1340) may be transmitted through 20 MHz so that the constellation rotation rule can be applied.

In case of applying the constellation rotation rule, a PPDU format (or a version of the wireless LAN system that has transmitted the PPDU) may be detected based on the constellation that was used for generating a modulation symbol that is being transmitted through the OFDM symbol. For example, a symbol that is being transmitted within a last OFDMA symbol (or last field) of the legacy part may be generated based on a first constellation, and a first OFDMS symbol (or first field) of the non-legacy part may be generated based on a second constellation.

In order to apply the constellation rotation rule, the first OFDM symbol or first field of the non-legacy part 1340 may be transmitted from a 20 MHz band. In other words, in order to allow the constellation rotation rule to be applied, the first OFDM symbol for first field of the non-legacy part 1340 may correspond to a common non-legacy block (or HE block) of 20 MHz.

The first field of the non-legacy part may correspond to HE-STF or HE-LTF for differentiating the bandwidth or may correspond to HE-SIG including identification information of multiple STAs that are to receive downlink frames.

Figure 14:
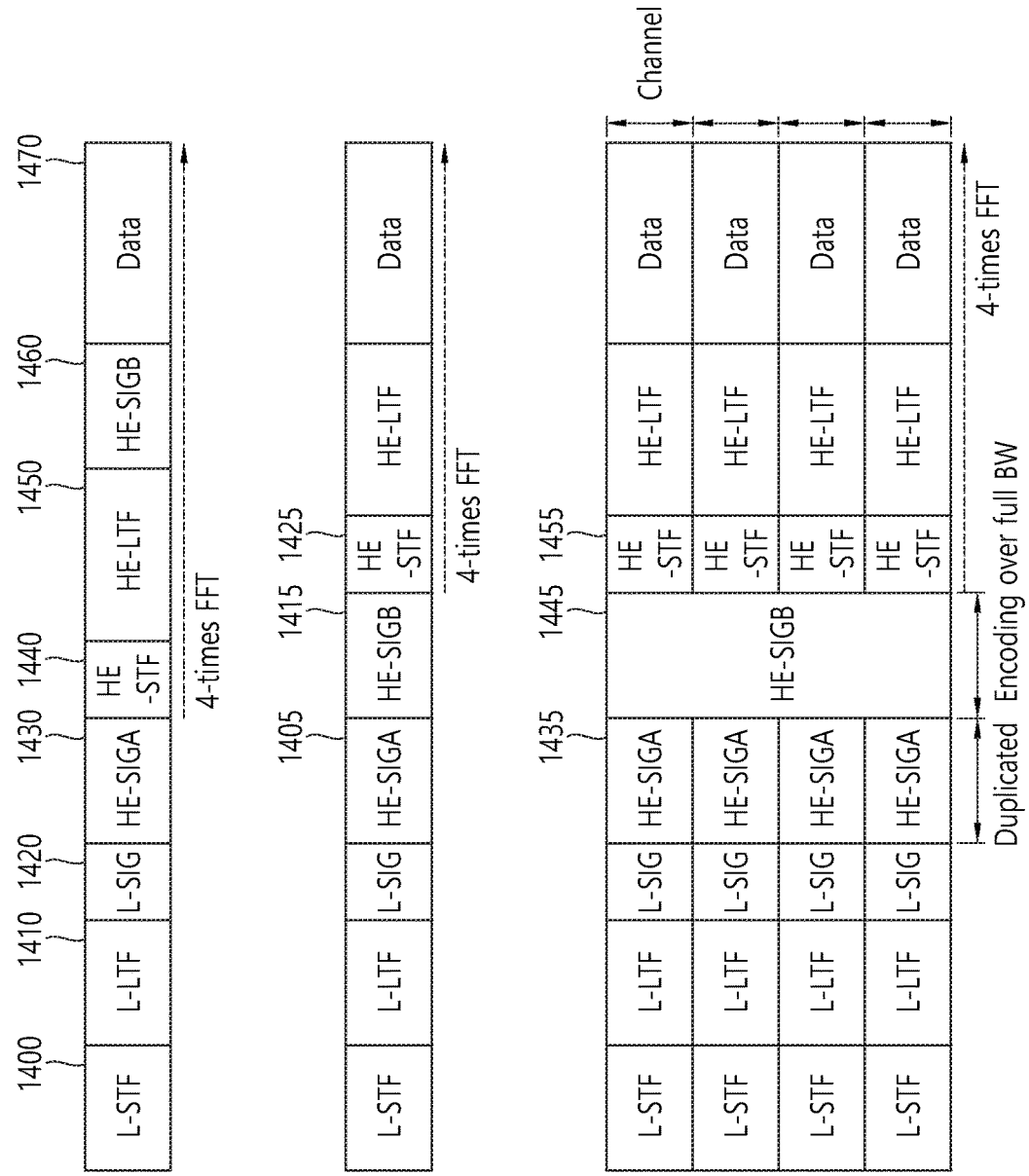
FIG. 14 illustrates a concept diagram showing a PPDU format for transmitting a frame according to an exemplary embodiment of the present invention.

FIG. 14 illustrates a concept diagram showing a PPDU format for transmitting a frame according to an exemplary embodiment of the present invention.

FIG. 14 discloses a PPDU format according to an exemplary embodiment of the present invention. The PPDU format disclosed in FIG. 14 may carry or include a downlink frame, which is transmitted based on the DL MU OFDMA transmission. Alternatively, the RTS frame and the CTS frame according to the exemplary embodiment of the present invention may also be transmitted through the PPDU format, which is disclosed in FIG. 14.

Referring to the upper part of FIG. 14, the PHY header of the downlink PPDU may include a L-STF(legacy-short training field), a L-LTF(legacy-long training field), a L-SIG (legacy-signal), a HE-SIG A(high efficiency-signal A), a HE-STF(high efficiency-short training field), a HE-LTF (high efficiency-long training field), and a HE-SIG B(high efficiency-signal-B). The PHY header may be divided into a legacy part, which consists of a part up to L-SIG, and a HE(high efficiency) part (HE part), which consists of after the L-SIG.

The L-STF 1400 may include a short training OFDM symbol (short training orthogonal frequency division multiplexing symbol). The L-STF 1400 may be used for frame detection, AGC(automatic gain control), diversity detection, and coarse frequency/time synchronization.

The L-LTF 1410 may include a long training OFDM symbol (long training orthogonal frequency division multiplexing symbol). The L-LTF 1410 may be used for fine frequency/time synchronization and channel prediction.

The L-SIG 1420 may be used for transmitting control information. The L-SIG 1420 may include information on data transmission rate, data length, and so on. As described above, the legacy STA may configure a NAV based on the information included in L-SIG.

The HE-SIG A 1430 may include information for indicating the STA that is intended to receive the PPDU. For example, the HE-SIG A 1430 may include an identifier of a specific STA that is to receive the PPDU, information for indicating the group of the STA. Additionally, in case the PPDU is transmitted based on OFDMA or MIMO, the HE-SIG A 1430 may also include resource allocation information respective to the STA.

Additionally, the HE-SIG A 1430 may also include color bits information for BSS identification information, bandwidth information, tail bit, CRC bit, MCS(modulation and coding scheme) information respective to the HE-SIG B 1460, information on the number of symbols for the HE-SIG B 1460, and CP(cyclic prefix) (or GI(guard interval)) length information.

The HE-STF 1440 may be used for enhancing automatic gain control estimation in a MIMO(multiple input multiple output) environment or an OFDMA environment.

The HE-LTF 1450 may be used for estimating a channel in a MIMO environment or an OFDMA environment.

The HE-SIG B 1460 may include information on a length MCS of a PSDU(Physical layer service data unit) respective to each STA and tail bit, and so on. Additionally, the HE-SIG B 1460 may also include information on an STA that is to receive the PPDU, OFDMA based resource allocation information (or MU-MIMO information). In case the OFDMA based resource allocation information (or MU-MIMO related information) is included in the HE-SIG B 1460, the resource allocation information may not be included in the HE-SIG A 1430.

The size of the IFFT being applied to the HE-STF 1440 and the field after the HE-STF 1440 may be different from the size of the IFFT being applied to the field before the HE-STF 1440. For example, the size of the IFFT being applied to the HE-STF 1440 and the field after the HE-STF 1440 may be four time larger than the size of the IFFT being applied to the field before the HE-STF 1440. The STA may receive the HE-SIG A 1430 and may receive indications on the reception of a downlink PPDU based on the HE-SIG A 1430. In this case, the STA may perform decoding based on a FFT size, which is changed starting from the HE-STF 1440 and the field after the HE-STF 1440. Conversely, in case the STA fails to receive indication on the reception of a downlink PPDU based on the HE-SIG A 1430, the STA may stop the decoding process and may configure a NAV(network allocation vector). The CP(cyclic prefix) of the HE-STF 1440 may have a size that is larger than the CP(cyclic prefix) of another field, and, during such CP interval, the STA may change the FFT size so as to perform decoding on the downlink PPDU.

The order of the field configuring the format of the PPDU, which is disclosed on the upper part of FIG. 14, may vary. For example, as shown in the middle part of FIG. 14, the HE-SIG B 1415 of the HE part may be located immediately after the HE-SIG A 1405. The STA may perform decoding on the HE-SIG A 1405 and up to the HE-SIG B 1415, so as to receive the required control information, and, then, the STA may configure the NAV. Similarly, the size of the IFFT being applied to the HE-STF 1425 and the field after the HE-STF 1425 may be different from the size of the IFFT being applied to the field before the HE-STF 1425.

The STA may receive the HE-SIG A 1405 and the HE-SIG B 1415. In case the reception of the PPDU is indicated based on the HE-SIG A 1405, the STA may change the FFT size starting from the HE-STF 1425 and may perform decoding on the PPDU. Conversely, in case the STA receives the HE-SIG A but fails to receive indication on the reception of the downlink PPDU based on the HE-SIG A 1405, the STA may configure a NAV(network allocation vector).

Referring to a lower part of FIG. 14, a PPDU format for DL MU transmission is disclosed. According to the exemplary embodiment of the present invention, the AP may transmit a downlink frame or a downlink PPDU to multiple STAs by using the PPDU format for DL MU transmission. Each of the multiple downlink PPDUs may be respectively transmitted to each of the multiple STAs through different transmission resources (frequency resources or space time streams). Within the PPDU, the field before the HE-SIG B 1445 may be transmitted in a duplicated format from transmission resources each being different from one another. The HE-SIG B 1445 may be transmitted in an encoded format within the entire transmission resource. The field after the HE-SIG B 1445 may include individual information for each of the multiple STAs receiving the PPDU.

In case the fields included in the PPDU are respectively transmitted through each of the transmission resources, a CRC respective to each field may be included in the PPDU. Conversely, in case a specific field included in the PPDU is encoded within the entire transmission resource and then transmitted, a CRC respective to each field may not be included in the PPDU. Accordingly, an overhead respective to the CRC may be reduced.

Similarly, in the PPDU format or the DL MU transmission, the HE-STF 1455 and the field after the HE-STF 1455 may be encoded based on an IFFT size that is different from the field before the HE-STF 1455. Therefore, in case the STA receives the HE-SIG A 1435 and the HE-SIG B 1445, and in case the STA receives an indication to receive the PPDU based on the HE-SIG A 1435, the STA may change the FFT size starting from the HE-STF 1455 and may then perform decoding on the PPDU.

Figure 15:
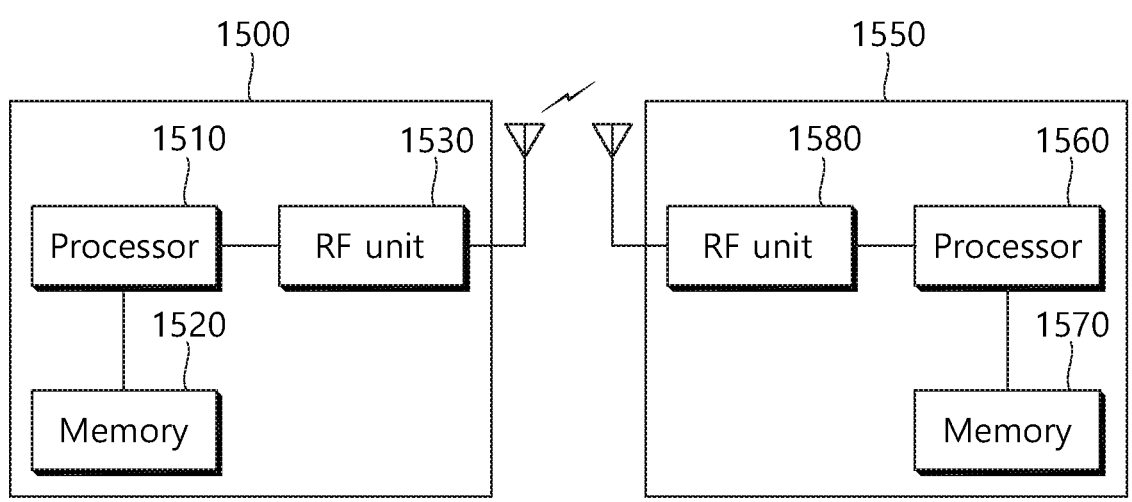
FIG. 15 illustrates a block diagram showing a wireless communication system in which the disclosure of this specification is implemented.

FIG. 15 illustrates a block diagram showing a wireless communication system in which the disclosure of this specification is implemented.

Referring to FIG. 15, as an STA that can realize the above-described exemplary embodiment, the wireless device 1500 may correspond to an AP 1500 or a non-AP STA (non-AP station) 1550.

The AP 1500 includes a processor 1510, a memory 1520, and a RF unit (radio frequency unit) 1530.

The RF unit 1530 is connected to the processor 1510, thereby being capable of transmitting and/or receiving radio signals.

The processor 1510 implements the functions, processes, and/or methods proposed in the present invention. For example, the processor 1510 may be realized to perform the operations of the wireless device according to the above-described exemplary embodiments of the present invention. The processor may perform the operations of the wireless device, which are disclosed in the exemplary embodiments of FIG. 1 to FIG. 14.

For example, the processor 1510 may be configured to transmit a RTS(request to send) frame for medium protection to a first STA(station) group and to sequentially receive CTS(clear to send) frames from each of multiple STAs being included in a second STA set as a response to the RTS frame. And, the processor 1510 may also be configured to respectively transmit each of multiple PPDUs (physical layer protocol data unit) to each of the multiple STAs through each of multiple subbands for each of the multiple STAs within an overlapping time resource. The second STA set may be included in the first STA set.

The STA 1550 includes a processor 1560, a memory 1570, and a RF unit (radio frequency unit) 1580.

The RF unit 1580 is connected to the processor 1560, thereby being capable of transmitting and/or receiving radio signals.

The processor 1560 implements the functions, processes, and/or methods proposed in the present invention. For example, the processor 1560 may be realized to perform the operations of the wireless device according to the above-described exemplary embodiments of the present invention. The processor may perform the operations of the wireless device, which are disclosed in the exemplary embodiments of FIG. 1 to FIG. 14.

For example, the processor 1560 may be implemented to receive a RTS frame from the AP and to transmit the CTS frame at a transmission timing, which is decided based on a position within the frequency resource of a subband for the STA.

The processor 1510 and 1560 may include an ASIC (application-specific integrated circuit), another chip set, a logical circuit, a data processing device, and/or a converter converting a baseband signal and a radio signal to and from one another. The memory 1520 and 1570 may include a ROM(read-only memory), a RAM(random access memory), a flash memory, a memory card, a storage medium, and/or another storage device. The RF unit 1530 and 1580 may include one or more antennas transmitting and/or receiving radio signals.

When the exemplary embodiment is implemented as software, the above-described method may be implemented as a module (process, function, and so on) performing the above-described functions. The module may be stored in the memory 1520 and 1570 and may be executed by the processor 1510 and 1560. The memory 1520 and 1570 may be located inside or outside of the processor 1510 and 1560 and may be connected to the processor 1510 and 1560 through a diversity of well-known means.

What is claimed is:

1. A method used in a wireless Local Area Network (LAN), comprising:
receiving, by a first station (STA) from an access point (AP), a single request to send (RTS) frame triggering transmission of multiple clear to send (CTS) frames from multiple STAs on an overlapping frequency band including a 20 MHz band during a same time period;
in response to the single RTS frame, transmitting, by the first STA to the AP, a first CTS frame on the overlapping frequency band during the same time period; and
receiving, by the first STA from the AP, a downlink physical layer protocol data unit (PPDU) based on the overlapping frequency band.

2. The method of claim 1, wherein a second CTS frame is transmitted by a second STA to the AP in response to the single RTS frame.

3. The method of claim 2, wherein the second CTS frame is transmitted to the AP on the overlapping frequency band during the same time period.

4. The method of claim 1, wherein the single RTS frame comprises a medium access control (MAC) header including an address field related to the multiple STAs.

5. The method of claim 4, wherein the MAC header further includes a duration field which is used for setting a network allocation vector (NAV) of an unintended receiver of the single RTS frame.

6. The method of claim 1, wherein the downlink PPDU includes user data for the multiple STAs.

7. A station (STA) in a wireless Local Area Network (LAN), comprising:
   a transceiver transmitting or receiving radio signals; and
   a processor connected to the transceiver and configured to:
   instruct the transceiver to receive, from an access point (AP), a single request to send (RTS) frame triggering transmission of multiple clear to send (CTS) frames from multiple STAs on an overlapping frequency band including a 20 MHz band during a same time period;
   in response to the single RTS frame, instruct the transceiver to transmit, to the AP, a first CTS frame on the overlapping frequency band during the same time period; and
   instruct the transceiver to receive, from the AP, a downlink physical layer protocol data unit (PPDU) based on the overlapping frequency band.

8. The station of claim 7, wherein a second CTS frame is transmitted by another STA to the AP in response to the single RTS frame.

9. The station of claim 8, wherein the second CTS frame is transmitted to the AP on the overlapping frequency band during the same time period.

10. The station of claim 7, wherein the single RTS frame comprises a medium access control (MAC) header including an address field related to the multiple STAs.

11. The station of claim 10, wherein the MAC header further includes a duration field which is used for setting a network allocation vector (NAV) of an unintended receiver of the single RTS frame.

12. The station of claim 7, wherein the downlink PPDU includes user data for the multiple STAs.

* * * * *